(12) United States Patent
Mabile et al.

(10) Patent No.: US 11,181,098 B2
(45) Date of Patent: Nov. 23, 2021

(54) OFFSHORE WIND TURBINE ON OFFSET FLOATING SUPPORT

(71) Applicant: IFP Energies nouvelles, Rueil-Malmaison (FR)

(72) Inventors: Claude Mabile, Clamart (FR); Jean-Christophe Gilloteaux, Rueil Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 14/102,554

(22) Filed: Dec. 11, 2013

(65) Prior Publication Data

US 2014/0167421 A1   Jun. 19, 2014

(30) Foreign Application Priority Data

Dec. 18, 2012 (FR) .................................... 12/03.464

(51) Int. Cl.
| | |
|---|---|
| *F03D 13/25* | (2016.01) |
| *F03D 13/20* | (2016.01) |
| *B63B 39/03* | (2006.01) |
| *B63B 39/00* | (2006.01) |
| *F03D 9/25* | (2016.01) |

(52) U.S. Cl.
CPC .............. *F03D 13/25* (2016.05); *B63B 39/00* (2013.01); *B63B 39/03* (2013.01); *F03D 9/25* (2016.05); *F03D 13/22* (2016.05); *F05B 2240/93* (2013.01); *Y02E 10/727* (2013.01)

(58) Field of Classification Search
CPC ..... Y02E 10/727; Y02E 10/747; Y02E 10/72; F05B 2240/95; F05B 2240/93; F03D 13/25; F03D 9/25; F03D 13/22; B63B 39/03; B63B 39/00

USPC ....................................................... 290/44, 55
See application file for complete search history.

(56) References Cited

U.S. PATENT DOCUMENTS

| | | | | |
|---|---|---|---|---|
| 6,294,844 | B1 * | 9/2001 | Lagerwey | F03D 13/25 290/44 |
| 7,075,189 | B2 * | 7/2006 | Heronemus | B63B 1/047 290/44 |
| 7,156,586 | B2 * | 1/2007 | Nim | B63B 35/44 405/195.1 |
| 7,456,515 | B2 * | 11/2008 | Nielsen | B63B 21/502 290/55 |
| 7,612,462 | B2 * | 11/2009 | Viterna | B63B 21/50 290/42 |

(Continued)

FOREIGN PATENT DOCUMENTS

| | | | | |
|---|---|---|---|---|
| CA | WO 2012103654 A1 * | 8/2012 | ............ | F03B 13/264 |
| DE | 10 2011 016824 A1 | 10/2012 | | |
| WO | WO 2012/085351 A1 | 6/2012 | | |

*Primary Examiner* — Charles Reid, Jr.
(74) *Attorney, Agent, or Firm* — Fitch, Even, Tabin & Flannery LLP

(57) ABSTRACT

The present invention relates to an offshore wind turbine on a floating support (1) comprising either a rotor with a horizontal rotation axis (horizontal-axis wind turbine HAWT) or a rotor with a vertical rotation axis (vertical-axis wind turbine VAWT) with the rotor being mounted on a floating support having a principal axis. According to the invention, the principal axis of the floating support is offset by an angle α with respect to either the axis of a tower carrying the horizontal-axis rotor or to the rotation axis of the vertical-axis rotor.

16 Claims, 5 Drawing Sheets

(56) References Cited

U.S. PATENT DOCUMENTS

| | | | | |
|---|---|---|---|---|
| 7,808,120 | B2* | 10/2010 | Smith | F03B 13/1815 |
| | | | | 290/42 |
| 8,022,566 | B2* | 9/2011 | Loh | F03D 7/0224 |
| | | | | 290/44 |
| 8,770,126 | B2* | 7/2014 | Nielsen | B63B 21/00 |
| | | | | 114/123 |
| 2003/0168864 | A1* | 9/2003 | Heronemus | F03D 13/25 |
| | | | | 290/55 |
| 2006/0269396 | A1* | 11/2006 | Borgen | 415/84 |
| 2009/0022597 | A1* | 1/2009 | Bowie | F03B 17/061 |
| | | | | 416/223 R |
| 2009/0120345 | A1* | 5/2009 | Sveen et al. | 114/264 |
| 2011/0006539 | A1* | 1/2011 | Lefranc | F03D 9/257 |
| | | | | 290/55 |
| 2011/0074155 | A1* | 3/2011 | Scholte-Wassink | E02D 27/50 |
| | | | | 290/44 |
| 2011/0135398 | A1* | 6/2011 | Lopez | B63B 39/03 |
| | | | | 405/195.1 |
| 2011/0140426 | A1* | 6/2011 | Garcia Lopez et al. | 290/44 |
| 2011/0148115 | A1* | 6/2011 | Roznitsky et al. | 290/44 |
| 2011/0285136 | A1* | 11/2011 | Desmeules | F03B 17/061 |
| | | | | 290/54 |
| 2012/0272614 | A1* | 11/2012 | Perner et al. | 52/745.17 |
| 2013/0302139 | A1 | 11/2013 | Wittrisch | |
| 2014/0193259 | A1* | 7/2014 | Borgen | 416/85 |

\* cited by examiner

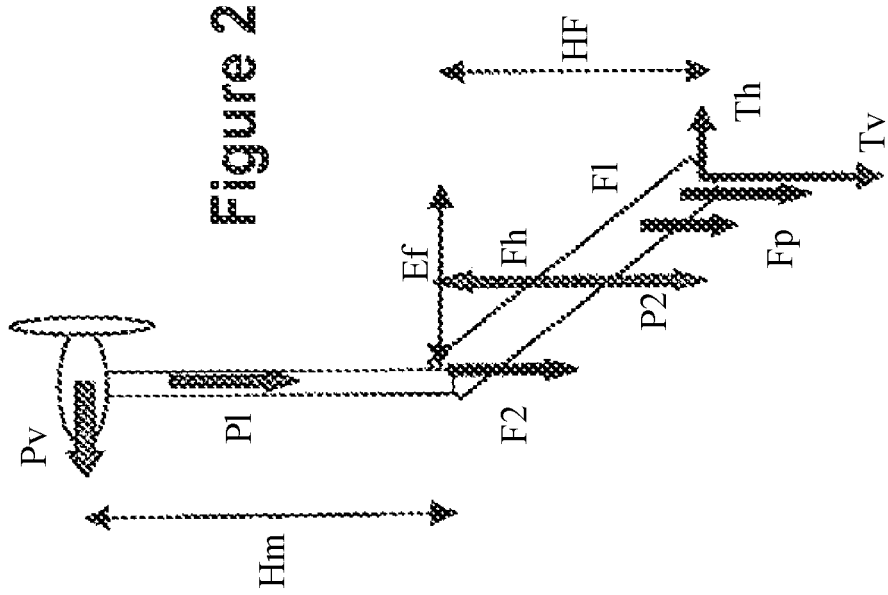

OFFSHORE WIND TURBINE ON OFFSET FLOATING SUPPORT

CROSS REFERENCE TO RELATED APPLICATION

Reference is made to French Patent Application Serial No. 12/03.464, filed on Dec. 18, 2012, which application is incorporated herein by reference in its entirety.

BACKGROUND OF THE INVENTION

Field of the Invention

The present invention relates to offshore wind turbines carried by floating supports. Minimizing or even eliminating the loss of horizontality when placing a horizontal-axis wind turbine (or the loss of verticality in the case of vertical-axis wind turbines) on a floating support is a major challenge in the design of floating supports. The present invention allows, with a float having a principal axis, to keep the rotation axis of the wind turbine perfectly horizontal or vertical whatever the wind force in the operating range of the wind turbine.

Description of the Prior Art

In order to increase the offshore electricity production capacity, it is necessary to install wind turbines at great water depths. It is generally considered in the industry that, beyond 50 m water depths, it is more economical to set the wind turbine on a floating support instead of using a support anchored to the sea bottom.

However, installing a wind turbine on a floating support involves certain difficulties, among which the hydrostatic stability of the system. Indeed, wind turbines, whether with a horizontal (HAWT) or a vertical (VAWT) axis, are massive systems (several hundred tons) whose center of gravity is several ten meters above the bottom of the wind turbine. For example, a 5-MW wind turbine has a mass of about 700 t (blades, nacelle and tower) and the center of gravity is located at a distance of 70 m. These wind turbines are sensitive, on the one hand, to the inclination of their rotation axis because it decreases the energy production efficiency and, on the other hand, to the movements of the floating support that can generate great accelerations that have to be taken into account for structure calculations.

Also, the major naval architecture design constraints minimize the trim of the floating support and its movement amplitudes. The movements can thus be damped by shifting the resonance periods of the floating support, by adjusting the size thereof or by adding plates. Regarding the hydrostatic restoring effect, naval architecture has few passive systems for counteracting heeling. In fact, the most efficient system is the TLP (Tension Leg Platform) that can theoretically not list due to the design of its anchor system. This embodiment is however costly to build and to install on-site.

Other float or anchor solutions are available to naval architects such as, by way of example, a long ballasted vertical column and catenary type anchors. The mass of the assembly, including the ballast, and the slim shape thereof allow the movements to be minimized. However, this principle does not allow the wind turbine axis to be maintained sufficiently horizontal or vertical, depending on the type. For example, the Hywind pilot by Statoil (2.3-MW wind turbine) comprises a float with a 100-m high and 8.3-m diameter column ballasted by 3600 tons of rock, with a total weight of 5300 tons. Despite these large dimensions, a static heel of 3 degrees is allowed. Now, the Hywind wind turbine is a "small" wind turbine compared to future floating offshore wind turbines whose economic optimum seems to lie between 7 and 10 MW.

Another way for fastening the wind turbine to a freely rotating float is direct anchoring to the sea bottom. The buoyancy provided by the float prevents the assembly from overturning but, by its very principle, it does not prevent the wind turbine axis direction to suffer the consequences of wind, waves or currents.

SUMMARY OF THE INVENTION

The present invention relates to an offshore wind turbine on a floating support comprising either a rotor with a horizontal rotation axis (HAWT) or a rotor with a vertical rotation axis (VAWT), the rotor being mounted on a floating support having a principal axis. According to the invention, the principal axis of the floating support is offset by an angle α with respect to either the axis of a tower carrying the horizontal-axis rotor or to the rotation axis of a vertical-axis rotor.

The present invention allows, with a float having a principal axis, to keep the rotation axis of the wind turbine perfectly horizontal or vertical whatever the wind force in the operating range of the wind turbine.

The floating support can comprise a fixed ballast at the base thereof.

The floating support can comprise a hydraulic ballast system for displacing a mass of liquid along the principal axis.

The floating support can comprise at least two tanks with one at the base and one in the upper part, and a system for liquid transfer between the two tanks.

A sea bottom anchoring system can be fastened to the base of the floating support.

The wind turbine can comprise a system for measuring inclination and a system for controlling the ballast system according to the measured inclination.

The floating support can have the shape of a cylinder.

The floating support can have the shape of a solid of revolution.

BRIEF DESCRIPTION OF THE DRAWINGS

Other features and advantages of the present invention will be clear from reading the description hereafter, given by way of non-limitative example, with reference to the accompanying figures wherein:

FIG. 2 shows the diagram of the forces acting upon the system;

DETAILED DESCRIPTION

In order to overcome the drawbacks of configurations different than TLPs, the invention is a floating offshore wind turbine which offsets by a predetermined angle the axis of the tower for a HAWT, or the axis of the wind turbine rotor for a VAWT, with respect to the principal axis of the floating support.

Figure 1A:
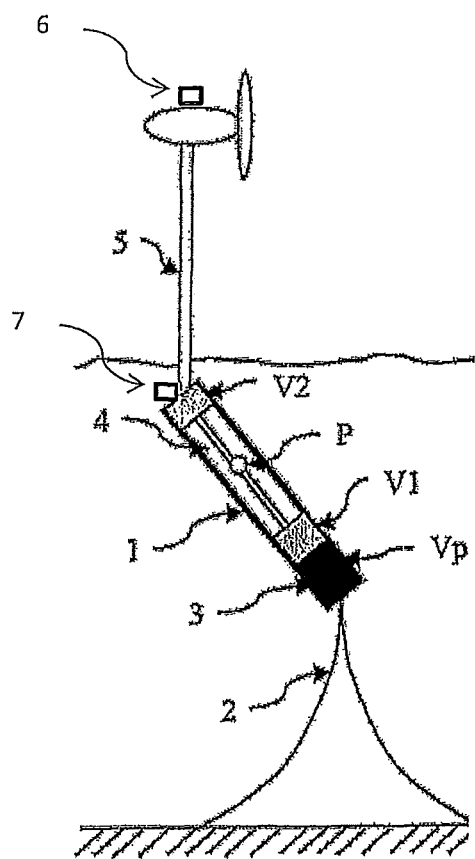
FIGS. 1a and 1b diagrammatically show the wind turbine according to the invention, having a HAWT and a VAWT configuration respectively.

According to FIG. 1a, floating support 1 preferably has a cylindrical shape and it is anchored to the sea bottom, preferably by catenary lines 2 fastened to keel 3.

The inner space of the float is partitioned into 4 volumes:
1. A volume Vp is located in the lower part of the float and has a permanent ballast, which can be, for example, made of cement or a mass of shot, rocks or metals.
2. A volume V1 is located above volume Vp and partly filled with liquid, such as sea water for example.
3. A volume V2 is located at the top of the float and is partly filled with the same liquid, such as sea water for example.
4. A volume 4 provides the buoyancy of the assembly of the floating support and wind turbine 5, which is a HAWT according to FIG. 1a and VAWT according to FIG. 1b.

Figure 1B:
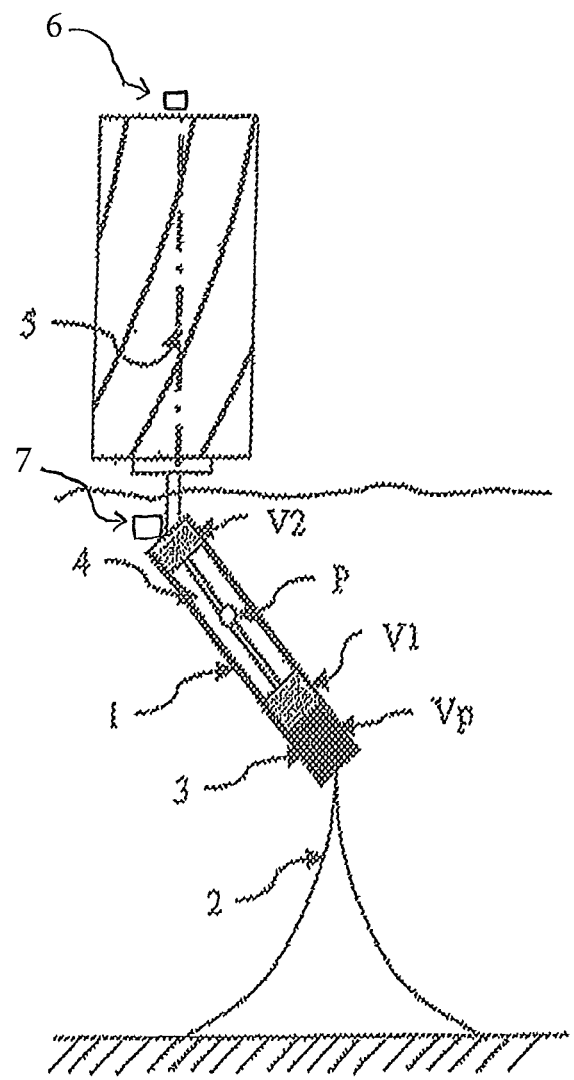

Both FIGS. 1a and 1b have a vertical inclination sensor 6 mounted on the wind turbine 5 which rocks vertically with the wind turbine. The sensor is connected (not illustrated) to a ballast control system 7 for controlling the ballast within volumes V1 and V2 by pumping liquid from one volume to the other volume by activation of pump P.

Volume Vp is totally filled with a solid ballast of mass Bp.

Volumes V1 and V2 are partly filled with liquid proportional to B1 and B2 respectively. A system of pipes and pumps P allows an amount of liquid to be transferred from volume V1 to V2. Transfer in the opposite direction can be done either by gravity or using pump P. By construction, the total volume of liquid B1+B2, preferably sea water, used as mobile ballast in the float, is fixed and distributed among volumes V1 and V2.

The action of the wind on the wind turbine, whether HAWT or VAWT, induces stresses that tend to cause the float to tilt, which is referred to as a trim angle. The presence of ballasts B1 and B2 thus allows, according to their relative positions and to their fill rate, trim change to be corrected. A stability survey was conducted with the geometry and the stresses shown in FIG. 2.

Nomenclature:
Pv is the thrust due to the wind
P1 is the force due to the weight of the wind turbine
P2 is the force due to the weight of the float
Fh is the buoyancy due to the immersed volume of the float
F1, F2 and Fp are forces due to the masses of ballasts B1, B2 and Bp
Tv and Th are vertical and horizontal traction forces exerted by the anchoring system
Hm is the height of the wind turbine tower
Hf and Ef are the dimensions depending on the length of the float and on the angle between tower and float.

The force balance equations are:

$$Pv+Th=0 \quad (1)$$

$$P1+F2+P2+F1+Fp+Tv-Fh=0 \quad (2)$$

The moment balance equation is calculated with respect to the mooring lines anchor point. it is considered that F2 applies at the top of the float and F1 and Fp are applied at the bottom thereof. This assumption is not strictly correct but simplifies the understanding of the example described here.

$$Pv \times (Hm+Hf) - F2 \times Ef + P2 \times Ef/2 - Fh \times Ef/2 = 0 \quad (3)$$

By considering a catenary type anchoring system, Tv, the anchoring vertical traction, is, to a first approximation, constant and it depends only on the anchoring type selected and on the water depth. By definition, F1+F2 is also a constant because this sum represents the total amount of sea water contained in the float and serving as a mobile ballast. Thus, Equation (2) allows determination of the volume required for the float to generate a sufficient thrust Fh in order to counteract all of the forces due to gravity.

Equation (3) can also be written as follows:

$$F2 \times Ef = (-Pv \times (Hm+Hf) - P2 \times Ef/2) + Fh \times Ef/2$$

or $$F2 = -Pv \times (Hm+Hf)/Ef + (Fh-P2)/2 \quad (4)$$

Equation (4) shows that, if the wind thrust Pv varies because the wind speed has changed, the wind turbine tower can be kept vertical by adjusting the volume of water of ballast B2 to cause F2 to vary.

Figure 3:
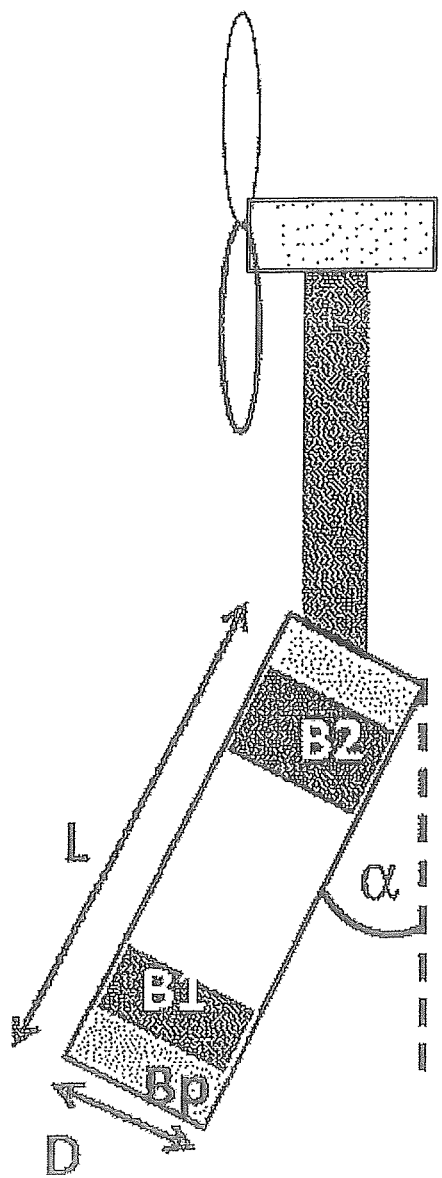
FIG. 3 shows the nomenclature used in the calculations.

Equation (4) involves the ratio (Hm+Hf)/Ef. This ratio depends on the total length L of the float (FIG. 3) and on fixed angle α between the axis of the float and the axis of the tower for a HAWT. Therefore:

$$Hf = L \cos(\alpha)$$

$$Ef = L \sin(\alpha).$$

Thus:

$$(Hm+Hf)/Ef = (Hm+L \cos(\alpha))/L \sin(\alpha).$$

By construction and depending on the wind conditions and on the wind turbine characteristics, judicious selection of length L of the float and of angle α between the axis of the float and the axis of the tower for a HAWT or the axis of the rotor for a VAWT allows water mass B2 to be optimized.

The demonstration that has been made for a HAWT can be conducted in the same way for a VAWT while reaching the same conclusions. In the case of a VAWT, the axis of the rotor corresponds to the tower of a HAWT.

Study of Hydrostatic Stability without Wind Thrust Force

Five main parameters are involved in the stability study of this concept which are:
1. The length L of the float
2. The diameter D of the float
3. The angle α between the axis of the float and the axis of the tower
4. The permanent ballast Bp at the bottom of the float
5. The variable ballast B1 for maintaining the tower of the wind turbine vertical, knowing that B1+B2 is a constant for L and D fixed.

A first study varies the distribution of ballast Bp and of fluid volume B1+B2 for a given geometric configuration (inclination, length, diameter), and thus in examining which are the best L, D and a parameters in terms of hydrostatic stability of the floating support.

Figure 4:
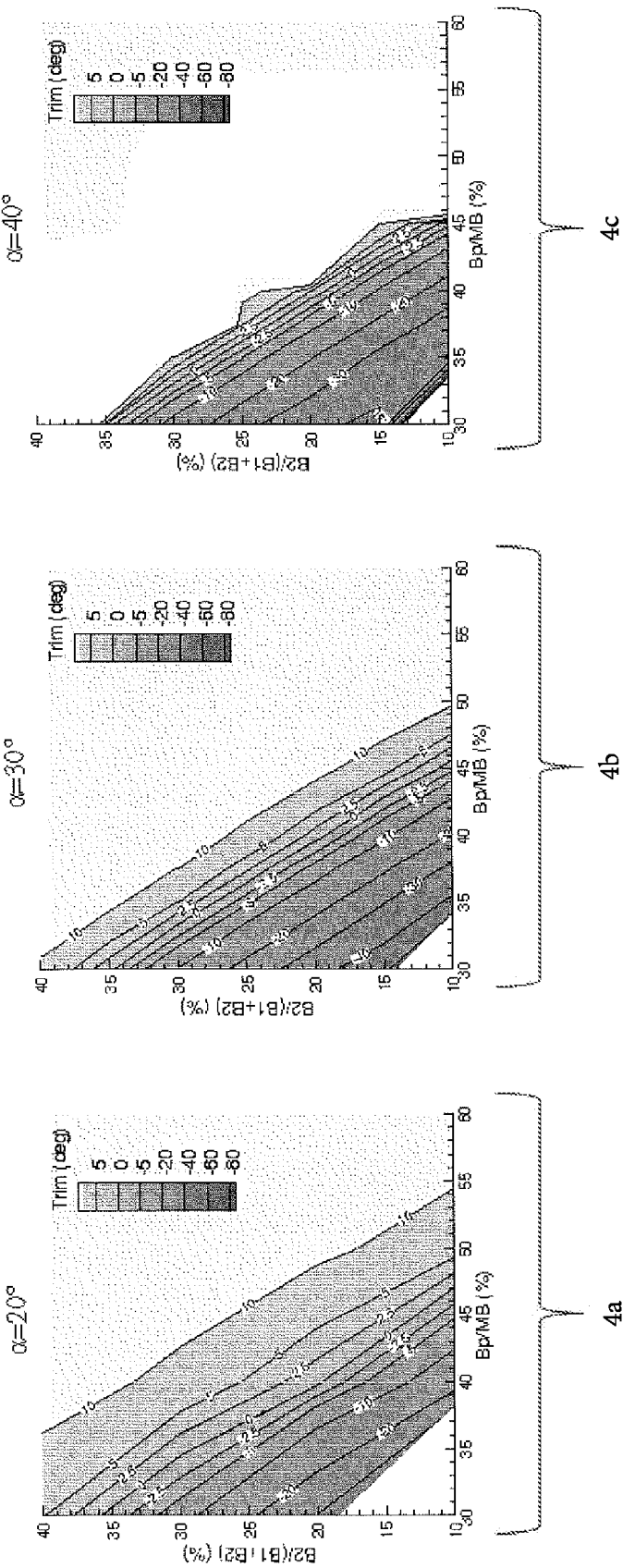
FIGS. 4a-c illustrates the advantages of the present invention.

The subfigures a-c of FIG. 4 thus show the variation in the trim angle (Trim) of the floating support as a function of the percentage of ballast Bp in relation to the total ballast mass (MB) and the percentage of fluid in volume V2 in relation to the total fluid mass B1+B2. These three subfigures represent the results for three different support inclinations (20°, 30°, 40°) when the float is 80 m in length and 20 m in diameter. It can be observed that, for a 40° inclination, many unstable solutions (white areas) or solutions leading to a great trim angle appear. It can also be seen that there is, for each pair of parameters, a solution with a zero trim angle, this result being however weighted by the fact that, with a small dynamic or permanent ballast difference, the support rapidly becomes unstable. On the other hand, for the other angles of inclination (20° and 30°), the floating support is stable whatever the distribution of the ballast and has zero trim angle solutions. It can also be noted that, in general, the greater the angle of inclination, the closer the iso-trim curves are to 0°, and therefore sensitive to the ballast distribution.

Study of Hydrostatic Stability with Maximum Wind Thrust Force

After the first study identifies plausible ballast distributions for given geometric configurations, the next stage examines how the float behaves while the wind turbine is operating. The presence of the nacelle and of the blades of the wind turbine is simply represented by a constant thrust force of 80 tons representative of the maximum thrust force generated by a 5-MW horizontal-axis wind turbine operating at nominal speed.

The table below thus shows the mass of water required in ballast B1 in order to obtain a zero trim angle for six given geometric configurations. Two different angles of inclination α (20° and 30°) have been selected, as well as three support lengths L (60 m, 80 m and 100 m). For each configuration, the given ballast distribution is selected for a zero thrust force and the distribution of the dynamic ballast is varied so as to correct the trim angle until a zero trim angle is obtained. It can be noted that the water transfer is very low in percentage, of the order of 5%, in relation to the configuration without thrust force.

| | | B2 | | |
|---|---|---|---|---|
| | | Float length L (m) | | |
| | | 60 | 80 | 100 |
| Angle α (deg) | 20 | 544 t | 733 t | 922 t |
| | 30 | 435 t | 733 t | 1110 t |

Other studies have also been carried out, such as the influence of a wind thrust axis change. When the wind rapidly changes direction, the wind thrust on the wind turbine is no longer in the plane of the tower and the float. These studies show that the wind turbine tilts by some degrees but still remains stable. Since the wind thrust axis is offset with respect to the anchoring point, the wind turbine automatically aligns with the wind direction. This action is not immediate but, after a few minutes, the wind thrust is back in the plane of the axis of the wind turbine tower and the axis of the float. Thus, the assembly straightens up.

These simulations show, on the one hand, that the embodiment is stable provided that the main sizing parameters are judiciously selected and that the dynamic ballasting for keeping the wind turbine tower of a HAWT or the axis of rotation of a VAWT vertical is fully feasible.

The present invention thus is a float of simple shape on which the wind turbine is set in such a way that the principal axis of the float and the reference axis of the wind turbine form a constant angle. This concept allows keeping the wind turbine axis horizontal for a HAWT or the axis of rotation vertical for a VAWT by displacing a liquid from one ballast to the next. It has been shown that, if the wind conditions happen to change, the wind turbine tilts but, either through ballasting in a case of a change in the wind force or through a natural realignment in a case of a change in the wind direction, the wind turbine regains a position that guarantees an optimum electricity production.

The invention claimed is:

1. An elongated offshore floating cylindrical support having a longitudinal axis which is moved vertically by control of a ballast system, a top support surface from which a fixed tower having a longitudinal principal axis vertically projects, a wind turbine fixedly attached to the tower which does not rotate relative to the longitudinal principal axis and the wind turbine having a horizontal rotational axis about which the wind turbine rotates during the generation of electricity comprising:

a sensor mounted on the tower for sensing an angular variation of the longitudinal principal axis of the tower from a vertical orientation during the generation of electricity with the sensed angular variation being used for controlling variation of trim of the offshore floating cylindrical support;

the ballast system consisting of cylindrically shaped stacked volumes which are a cylindrically shaped permanent ballast volume located in a bottom part of the ballast system, a first cylindrically shaped volume located above the cylindrically shaped permanent ballast volume which is partially filled with a liquid, a second cylindrically shaped volume located above the first cylindrically shaped volume which is partially filled with the liquid and another cylindrically shaped volume which is located between the first and second volumes which provides buoyancy and includes a pump which pumps the liquid between the first and second volumes to vary the trim of the offshore floating cylindrical support and a control system coupled to the pump for controlling the pump in response to the sensed angular variation from the vertical orientation during the generation of electricity for maintaining the horizontal axis of the wind turbine in a horizontal orientation and an angle between the longitudinal axes is constant and the cylindrically shaped stacked volumes are fully contained within an elongated outer cylindrical wall of the offshore cylindrical support.

2. The wind turbine as claimed in claim 1, wherein the permanent ballast is fixed.

3. The wind turbine as claimed in claim 2, wherein the pump pumps the liquid along the principal tower axis between the first and second volumes.

4. The wind turbine as claimed in claim 3, comprising a sea bottom anchoring system fastened to the offshore floating cylindrical support.

5. The wind turbine as claimed in claim 2, comprising a sea bottom anchoring system fastened to the offshore floating cylindrical support.

6. The wind turbine as claimed in claim 1, wherein the pump pumps the liquid along the principal tower axis between the first and second volumes.

7. The wind turbine as claimed in claim 6, comprising a sea bottom anchoring system fastened to the offshore floating cylindrical support.

8. The wind turbine as claimed in claim 1, comprising a sea bottom anchoring system fastened to the offshore floating cylindrical support.

9. An elongated offshore floating cylindrical support having a longitudinal axis which is moved vertically by control of a ballast system, a top support surface from which a fixed tower having a longitudinal principal axis vertically projects, a wind turbine fixedly attached to the tower which does not rotate relative to the longitudinal principal axis and the wind turbine having a vertical rotational axis about which the wind turbine rotates during the generation of electricity comprising:

a sensor mounted on the tower for sensing an angular variation of the longitudinal principal axis of the tower from a vertical orientation during the generation of electricity with the sensed angular variation being used for controlling variation of trim of the offshore floating cylindrical support;

the ballast system consisting of cylindrically shaped stacked volumes including a cylindrically shaped permanent ballast volume located in a bottom part of the ballast system, a first cylindrically shaped volume located above the cylindrically shaped permanent ballast volume which is partially filled with a liquid, a second cylindrically shaped volume located above the first cylindrically shaped volume which is partially filled with the liquid and another cylindrically shaped volume which is located between the first and second volumes which provides buoyancy and includes a pump which pumps the liquid between the first and second volumes to vary the trim of the offshore floating cylindrical support and a control system coupled to the pump for controlling the pump in response to the sensed angular variation from the vertical orientation during the generation of electricity for maintaining the vertical axis of the wind turbine in a vertical orientation and an angle between the longitudinal axes is constant and the cylindrically shaped stacked volumes are fully contained within an elongated outer cylindrical wall of the offshore cylindrical support.

10. The wind turbine as claimed in claim 9, wherein the permanent ballast of the offshore floating cylindrical support is fixed.

11. The wind turbine as claimed in claim 10, wherein the pump pumps the liquid along a the principal axis between the first and second volumes.

12. The wind turbine as claimed in claim 11, comprising a sea bottom anchoring system fastened to the offshore floating cylindrical support.

13. The wind turbine as claimed in claim 10, comprising a sea bottom anchoring system fastened to the offshore floating cylindrical support.

14. The wind turbine as claimed in claim 9, wherein the pump pumps the liquid along the principal axis between the first and second volumes.

15. The wind turbine as claimed in claim 14, comprising a sea bottom anchoring system fastened to the offshore floating cylindrical support.

16. The wind turbine as claimed in claim 9 comprising a sea bottom anchoring system fastened the offshore floating cylindrical support.

\* \* \* \* \*